July 28, 1936.  A. F. GARDNER  2,049,366
OIL SEAL
Filed Nov. 19, 1932  2 Sheets-Sheet 1
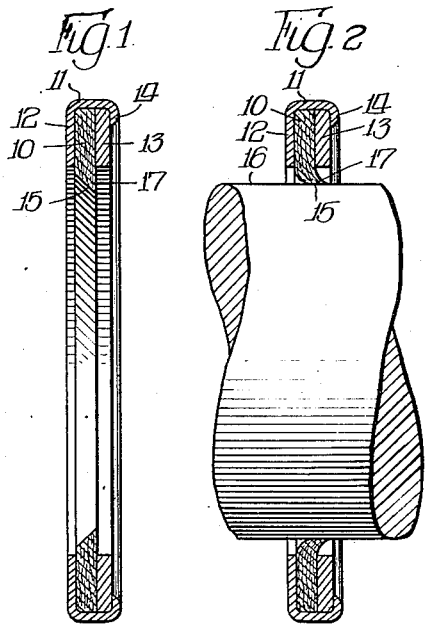
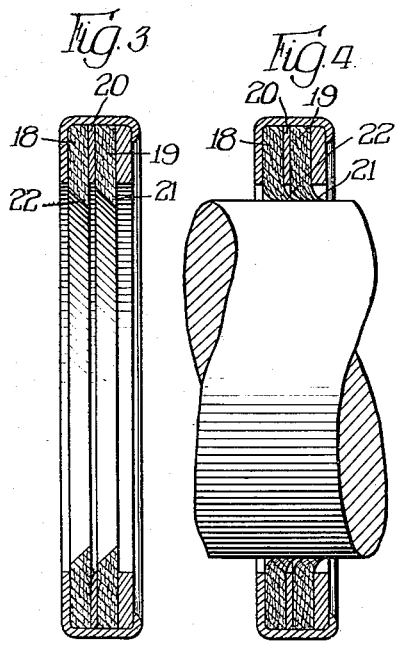
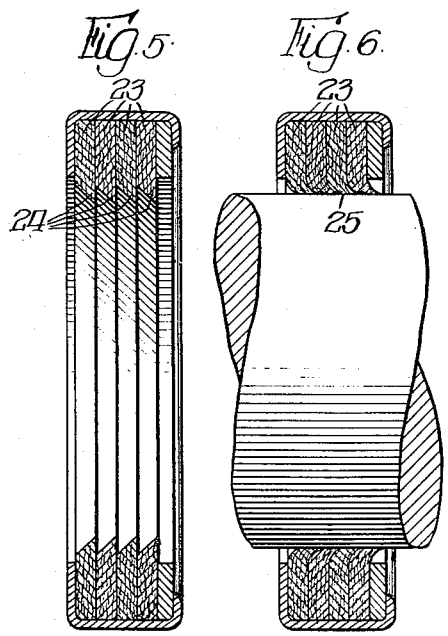
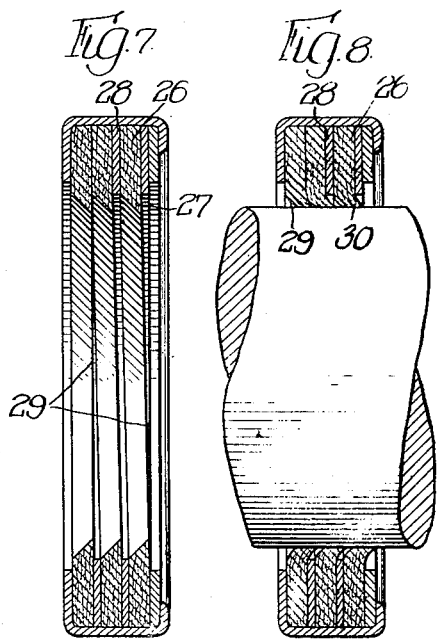
Inventor
Allen F. Gardner
By Cromwell, Greist & Warden
attys July 28, 1936.  A. F. GARDNER  2,049,366
OIL SEAL
Filed Nov. 19, 1932   2 Sheets-Sheet 2
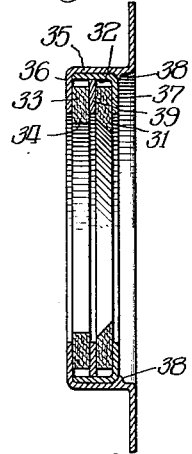
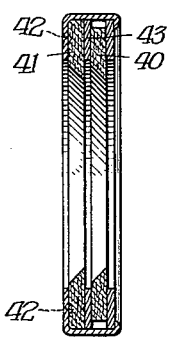
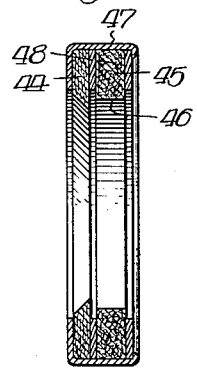
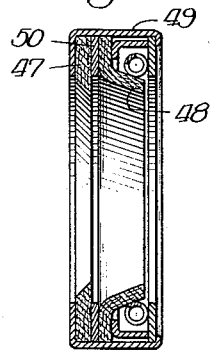
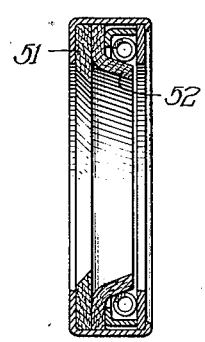
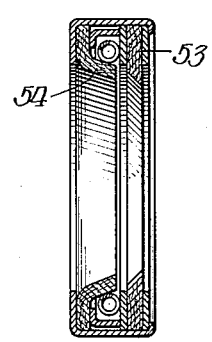
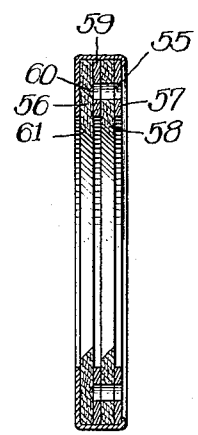
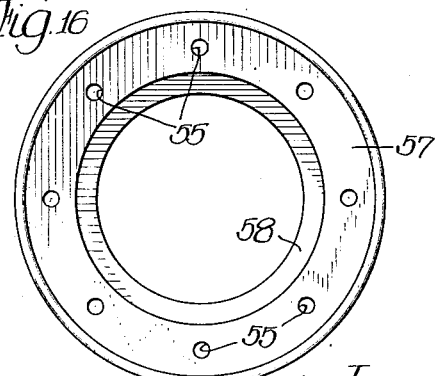
Inventor:
Allen F. Gardner,
By Cromwell, Greist & Warden
Attys.

Patented July 28, 1936

2,049,366

UNITED STATES PATENT OFFICE 2,049,366

OIL SEAL

Allen F. Gardner, Detroit, Mich., assignor to Chicago Rawhide Manufacturing Company, Chicago, Ill., a corporation of Illinois Application November 19, 1932, Serial No. 643,331

11 Claims. (Cl. 286—5)

This invention has to do with seals of the type commonly used at the ends of housings about moving shafts for the purpose of preventing any leakage of oil or other fluids from the housings along the shafts.

The object of the invention is to provide an improved seal which will give an efficient sealing action over a long period of time and yet is simple and inexpensive to manufacture.

The improved seal, in a preferred form, consists of an annular holder and a flat centrally apertured sheet leather packing member. The packing member is mounted in the holder, with the inner edge of the former projecting inwardly a little beyond the inner edge of the latter, and with practically all but the projecting edge of the packing member rigidly supported against flexure by the arrangement of the sides of the holder relative to the same. The projecting edge of the packing member is beveled, from one face to the other, and it is this beveled edge portion which performs the sealing function. The face of the packing member at the small diameter end of the bevel is preferably a smoothly finished grain face. In fitting a seal of this character to a shaft, a size of seal is selected in which the large diameter end of the bevel is preferably larger than the shaft and the small diameter end is smaller than the shaft. When the shaft is pushed through the seal from the large diameter end of the bevel toward the small diameter end, the thin soft tapering lip resulting from the bevel will be somewhat distended and compacted and will be drawn out a little by the shaft in the direction of the small diameter end of the bevel, into a curved closely hugging fillet-like formation.

While the foregoing statements are indicative in a general way of the nature of the invention, other more specific objects and advantages will be apparent to those skilled in the art upon a full understanding of the construction, arrangement and operation of the improved seal.

Several different forms of the invention are presented herein by way of exemplification, but it will of course be appreciated that the invention may be embodied in numerous other structurally modified forms coming equally within the scope of the appended claims.

In the accompanying drawings:

Figs. 1 and 2 are diametric sectional views through a seal which is constructed in accordance with the invention, showing the seal before and after being applied to a shaft;

Figs. 3 and 4, 5 and 6, and 7 and 8 are similar views through modified seal structures which also embody the invention;

Figs. 9 to 14 inclusive are diametric sectional views through still other seal structures which embody the invention; and Figs. 15 and 16 are diametric sectional and face views, respectively, of another seal structure which is constructed in accordance with the invention.

The seal which is shown in Figs. 1 and 2 consists of a flat centrally apertured sheet leather packing member 10 and a holder 11. The holder is composed of a sheet metal cup 12 and a sheet metal washer 13. The packing member 10 is clamped against the bottom of the cup by the washer, and the washer is held in position by a small inturned flange 14 on the rim of the cup.

The inner edge 15 of the packing member is beveled, from one face to the other, preferably at an angle of about 45 degrees, and but little more than the beveled portion projects inwardly from the holder. When the seal is forced over a shaft 16 of the proper size, the inwardly tapering lip 17 which results from the beveling of the edge 15 will sleeve out a little on the shaft on the oil side of the seal, with the lip 17 closely hugging the shaft in a small fillet-like formation.

The seal which is shown in Figs. 3 and 4 includes a supplementary beveled edge packing member 18 which is located in back of the main packing member 19 and is separated from the same by a sheet metal washer 20. Should any oil work past the lip 21 on the member 19, it will be effectively stopped by the lip 22 on the member 18.

In the seal which is shown in Figs. 5 and 6, several beveled edge packing members 23 are employed, one behind the other, without any interposed spacing means. When this seal is placed on a shaft, the lips 24 will nest together and will combine to present a laminated but substantially uninterrupted sealing sleeve 25 which is characterized by a plurality of parallel alternating high and low pressure planes.

In the seal which is shown in Figs. 7 and 8, the packing, instead of being in the form of a flat centrally apertured leather member, is a helically wound leather strip 26. The strip 26 is beveled along its inner edge 27 and its convolutions are separated from each other by a helically wound metal strip 28. The ends of both strips are tapered off to fine tips 29 in order to avoid leaving any gaps. The helically extending lip 30 fits about the shaft in the fillet-like formation heretofore described, and the shaft is intended to turn in such direction as to cause the helically wound lip 30 to keep back any seepage of oil by a screw-like wiping action on the shaft.

In Fig. 9 a seal is shown in which the beveled edge leather packing member 31 is of smaller outside diameter than the inside diameter of the groove 32 in the holder, and the packing member is designed to float radially in the groove, the compression against the sides of the packing member being sufficient to prevent leakage but not so great as to interfere with the floating movement. In this embodiment of the invention, the packing member 31 has associated with it a second centrally apertured leather packing member 33, which second member has a plain inner edge 34 as distinguished from a beveled inner edge. The member 33 is designed to float in the same manner as the member 31. Both leather packing members may be so proportioned relative to the shaft as to fit tightly on and rotate with the same, turning in the holder 35. The holder 35 may be made in any one of a great many different forms, but in this particular embodiment it is shown as including an outer cup-shaped member 36 and an inner cup-shaped member 37. The cup member 37 is inversely nested within the cup member 36 and is held in position by small projections 38 on the inside of the rim of the cup member 36. The leather packing members 31 and 33 are compressed between the bottoms of the cup members and an interposed spacing washer 39.

In Fig. 10 two beveled edge leather packing members 40 and 41 are employed. The packing member 40 on the oil side of the seal is shiftable radially in the holder and is designed to rotate with the shaft, while the packing member 41 is held against movement in the holder by spur-like projections 42 in the back of the holder. The packing members are separated from each other by a washer 43.

In Fig. 11 the seal includes, in addition to the beveled edge leather packing member 44, a felt ring 45, which ring has a plain inner edge 46 and is mounted in the holder 47 on the oil side of the packing member 44. The felt ring 45 is separated from the leather packing member 44 by a washer 48.

In Figs. 12, 13, and 14 the novelly shaped and supported packing member of the invention is shown combined in various ways with a flanged leather packing member of the type disclosed in Clark Patent No. 1,807,567. In Fig. 12 the flat beveled edge packing member 47 is positioned behind the flanged packing 48 in the holder 49 and is separated from the same by a washer 50. In Fig. 13 the flat packing member 51 is again positioned behind the flanged packing member 52, but in this form the two leather members are placed against each other, instead of being separated by a washer. In Fig. 14 the flat packing member 53 is positioned on the oil side of the flanged packing member 54. The employment of the novel flat beveled inner edge packing member with a flanged and spring-pressed packing member, as illustrated in these three views, has been found to give exceptionally fine results.

The seal which is shown in Figs. 15 and 16 is the same as the one shown in Figs. 3 and 4 except for the additional of novel lubricating means. The lubricating means consists of holes 55 which are drilled in that face of the seal which is exposed to the oil chamber. The holes permit the oil to readily work through to the second leather packing member 56, thereby assuring sufficient lubrication for the same. The holes are drilled through the washer 57, the front leather packing member 58, the spacing washer 59 and the grain surface 60 of the back leather packing member. This permits the oil to enter the fibrous body of the packing member 56 and work inwardly through the same to the beveled edge 61. By lubricating the edge 61 in this way, excessive friction and burning out of the otherwise possibly dry back member 56 is prevented.

The important features of this invention are the beveling of the inner edge of the packing member with the large diameter end of the beveled edge preferably, though not necessarily, of slightly larger diameter than the shaft, and the supporting of this flat packing member between centrally apertured plates which extend inwardly, preferably on both sides of the packing member, to a point closely adjacent the large diameter end of the beveled edge. If the packing member is supported by the holder to a point too close to the shaft, the inner beveled edge of the packing member will be restricted and undue friction will develop, while if it is not supported close enough to the shaft, particularly on the lip side, the packing member will not be held tightly enough to prevent an undesirable amount of flexing and will not provide an efficient grease-sealing packing. Best results seem to be obtained by beveling the inner edge of the leather packing member at an angle of about 45 degrees and by extending the supporting sides of the holder inwardly to a point which is spaced from the large diameter end of the beveling a distance not in excess and preferably less than the radial extent of the beveling.

The packing member of the seal has been described herein as being made of leather, but it is of course possible that other materials, such as rubber or rubber compositions which are impervious to oil or flexible fiber compositions might be employed in some of the assemblies with measurably satisfactory results.

While the improved seal is ordinarily used with a shaft, it may, of course, be used with some other kind of circular relatively rotatable member, such as one of the races of a roller bearing, so the term "shaft" as used in certain of the claims is to be understood as including such other members within its meaning.

I claim:
1. An oil seal for coaction with a shaft, comprising a holder, and a substantially flat centrally apertured packing member, the inner edge of which is beveled and of slightly smaller diameter than the diameter of the shaft to be sealed, the construction and arrangement being such that a portion of the beveled edge is flexed to extend axially of the shaft.

2. An oil seal for coaction with a shaft, comprising a substantially flat centrally apertured packing member, the inner edge of which is beveled and of slightly smaller diameter than the diameter of the shaft to be sealed, and means for supporting the packing member adjacent the inner edge thereof, the construction and arrangement of the packing member and holding means being such that a portion only of the beveled edge is flexed to extend axially of the shaft upon application of the seal to the shaft.

3. In an oil sealing unit, an annular holder, and a flat centrally apertured sheet leather packing member mounted in the holder, said packing member having the circular inner edge thereof beveled, and said holder being so arranged as to allow only the beveled lip of the packing member to be flexed axially to any appreciable extent when the unit is forced over a shaft.

4. In an oil sealing unit, an annular holder, and a flat centrally apertured sheet leather packing member mounted in the holder, said packing member having the circular inner edge thereof beveled from one face to the other at an angle of about 45°, and said holder extending inwardly against the opposite sides of the packing member without interruption throughout the entire circumference thereof to a point which is spaced from the large diameter end of the bevel a distance less than the radial extent of the bevel.

5. In an oil sealing unit, an annular holder, and a flat centrally apertured sheet leather packing member mounted in the holder, said packing member having the circular inner edge thereof beveled from one face to the other with the large diameter end of the bevel made larger in diameter than the shaft which the seal is designed to fit.

6. In an oil sealing unit, an annular holder, a plurality of flat centrally apertured sheet leather packing members mounted in the holder, and means providing for the introduction of a lubricant to the packing member at the back of the holder.

7. In an oil sealing unit for coaction with a shaft, an annular holder, a plurality of flat centrally apertured sheet leather packing members mounted in the holder, which members have the circular inner edges thereof beveled at an angle to the surface of the shaft to provide sealing lips, and means for spacing the packing members far enough apart to prevent the sealing lip on one of the members from contacting with the adjacent member.

8. In an oil seal for coaction with a shaft, a substantially flat centrally apertured packing element of leather or other similar material which has the circular inner edge thereof beveled at an angle to the surface of the shaft, said beveled edge being initially of smaller diameter than the shaft and being distended into an axially projecting fillet-like sealing lip.

9. In an oil seal for coaction with a relatively rotatable member, a packing element of leather or other similar material having an annular edge which is beveled at an angle to the surface of the coacting member, said edge being initially of a different diameter than the member and being forced back into an axially projecting fillet-like sealing lip.

10. In an oil seal for coaction with a rotating shaft, the combination with a centrally apertured sheet leather packing having an axially projecting conical sleeve portion for engagement with the shaft, of another centrally apertured sheet leather packing which is located at the side opposite the direction of projection of the sleeve portion and has its inner edge beveled at an angle to the shaft for flexed distention of the beveled portion by the shaft.

11. The combination with a shaft, of an oil sealing device comprising a washer of fibrous material, and an annular casing in which said washer is confined, said washer having an annular wall surrounding said shaft and exposed to the supply of lubricant which it is to retain, said wall making an angle of at least 90° with said shaft, and the inner margin of said washer opposite to said wall being beveled at an acute angle to said shaft to provide a relatively thin edge on the washer for engagement with the shaft.

ALLEN F. GARDNER.